US010514587B2

(12) United States Patent
Sakamoto et al.

(10) Patent No.: US 10,514,587 B2
(45) Date of Patent: Dec. 24, 2019

(54) INTERVAL CONTROL-TYPE OPTICAL COMB

(71) Applicant: NATIONAL INSTITUTE OF INFORMATION AND COMMUNICATIONS TECHNOLOGY, Koganei-shi, Tokyo (JP)

(72) Inventors: Takahide Sakamoto, Koganei (JP); Naokatsu Yamamoto, Koganei (JP); Atsushi Matsumoto, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 16/336,467
(22) PCT Filed: Sep. 12, 2017
(86) PCT No.: PCT/JP2017/032887
§ 371 (c)(1),
(2) Date: Mar. 25, 2019
(87) PCT Pub. No.: WO2018/061747
PCT Pub. Date: Apr. 5, 2018

(65) Prior Publication Data
US 2019/0250484 A1 Aug. 15, 2019

(30) Foreign Application Priority Data
Sep. 30, 2016 (JP) ................. 2016-195251

(51) Int. Cl.
*G02F 2/02* (2006.01)
*G02F 1/01* (2006.01)
(52) U.S. Cl.
CPC ............. *G02F 2/02* (2013.01); *G02F 1/0123* (2013.01); *G02F 2203/56* (2013.01)
(58) Field of Classification Search
CPC .................................................. G02F 2203/56
See application file for complete search history.

(56) References Cited

U.S. PATENT DOCUMENTS

| 7,953,303 B2 * | 5/2011 | Gheorma | G02F 1/2255 385/2 |
| 9,395,535 B2 * | 7/2016 | Schneider | G02B 26/06 |
| 2011/0007383 A1 | 1/2011 | Gheorma et al. | |

FOREIGN PATENT DOCUMENTS

| JP | 2007-248660 A | 9/2007 |
| JP | WO2007/108148 A1 | 9/2007 |

(Continued)

OTHER PUBLICATIONS

Q. Chang, J. Gao and Y. Su, "Generation of optical comb frequency signal with high spectral flatness using two cascaded optical modulators," 2008 Asia Optical Fiber Communication & Optoelectronic Exposition & Conference, Shanghai, 2008, pp. 1-3. (Year: 2008).*

(Continued)

*Primary Examiner* — Rhonda S Peace
(74) *Attorney, Agent, or Firm* — Pyprus Pte Ltd

(57) ABSTRACT

To provide an optical comb generation device and an optical comb signal generation method capable of stably generating an optical comb signal having an optical frequency interval exceeding the drive electric signal band of a modulator. When light output from a first optical modulator 5 and a second optical modulator 7 is multiplexed in a multiplexing unit 13, the first optical modulator 5 and the second optical modulator 7 cancel the even-ordered components or odd-ordered components included in the light output from the first optical modulator 5 and the second optical modulator 7 and, when light output from a third optical modulator 9 and a fourth optical modulator 11 is multiplexed in the multiplexing unit 13, the third optical modulator 9 and the fourth optical modulator 11 cancel the even-ordered components or odd-ordered components included in the light output from the third optical modulator 9 and the fourth optical modulator 11, wherein the same components cancelled in the light output from the first optical modulator 5 and the second optical modulator 7 are cancelled.

6 Claims, 8 Drawing Sheets

(56) References Cited

FOREIGN PATENT DOCUMENTS

| JP | 2011-221366 A | 11/2011 |
|---|---|---|
| JP | 5665038 B2 | 2/2015 |
| JP | 2015-513702 A | 5/2015 |

OTHER PUBLICATIONS

S. Zhang, J. Yan, Z. Xia, X. Yao, M. Bai and Z. Zheng, "Generation of tunable optical frequency combs with a high side mode suppression ratio," 2014 Conference on Lasers and Electro-Optics (CLEO)—Laser Science to Photonic Applications, San Jose, CA, 2014, pp. 1-2. (Year: 2014).*
International Search Report of International Patent Application No. PCT/JP2017/032887 completed Dec. 5, 2017 and dated Dec. 19, 2017 (4 pages).
Written Opinion of International Patent Application No. PCT/JP2017/032887 completed Dec. 5, 2017 and dated Dec. 19, 2017 (4 pages).
Wang, Q. et al., Ultra-flat optical frequency comb generator using a single-driven dual-parallel Mach-Zehnder modulator, Optics Letters, May 15, 2014, vol. 39, No, 10, pp. 3050-5053.
Yan, J. J. et al, A tunable frequency comb generator using a single dual parallel Mach-Zehnder modulator, Optics & Laser Technology, Apr. 17, 2015, vol. 72, pp. 74-78.
マハツェンダ 型光変調器 の非対称プッシュプル駆動 による超平坦 光コム発生. vol. 3, Sep. 2007, p. 1210 (Extended Abstracts, Annual Meeting, Japan Society of Applied Physics), non-official translation (Sakamoto, Takahide et al., Flat Comb Generation Using Mach-Zehnder-Based Modulator with Asymmetric Push-Pull Drive).

* cited by examiner

L=0

L=1

L=2

L=3

INTERVAL CONTROL-TYPE OPTICAL COMB

TECHNICAL FIELD

The present invention relates to an optical comb generation device. More specifically, the present invention relates to an optical comb generation device that generates an optical comb signal having intervals of integer multiple of a frequency of a modulator.

BACKGROUND ART

For example, JP 2007-248660 A describes an ultra-flat optical comb generation device.
For example, JP 5665038 B1 describes a wide-band optical comb generation device.

CITATION LIST

Patent Literature

Patent Literature 1: JP 2007-248660 A
Patent Literature 2: JP 5665038 B1

SUMMARY OF INVENTION

Technical Problem

A conventional optical comb generation device has a problem that it is difficult to perform both control of frequency intervals of the comb and acquisition of stable comb signal.
Therefore, an object of the present invention is to provide an optical comb generation device and an optical comb signal generation method which can stably generate an optical comb signal having optical frequency intervals exceeding a drive electric signal band of a modulator.

Solution to Problem

The present invention basally includes at least n (n is an integer of 1 or more) optical modulators in parallel and adjusts the optical modulators so as to generate an optical comb signal having frequency intervals of a drive signal of the optical modulators by n pairs. Then, phases, or amplitudes and phases of signals having frequencies cancelling each other out are adjusted in order to be able to obtain an optical comb signal having desired frequency intervals. Then, in the optical comb signal, components having desired frequency intervals intensify each other, and components having frequencies cancelling each other out cancel each other out. By doing so, it is possible to stably generate an optical comb signal having optical frequency intervals exceeding the drive electric signal band of the modulator.

Further, by a plurality of optical modulator pairs included in $2n$ or more optical modulators in parallel, a mechanism that controls amplitudes and phases of each frequency component of the optical comb signal to be generated is expanded. Therefore, frequency interval control and the like of the optical comb signal to be generated can be performed, and further, an optical comb having high intensity frequency components can be generated.

A first aspect of the present invention relates to an optical comb generation device. The optical comb generation device 1 has
a demultiplexing unit 3 that demultiplexes input light,
a first optical modulator 5 into which first light demultiplexed by the demultiplexing unit 3 is inputted and which performs first modulation,
a second optical modulator 7 into which second light demultiplexed by the demultiplexing unit 3 is inputted and which performs second modulation,
a third optical modulator 9 into which third light demultiplexed by the demultiplexing unit 3 is inputted and which performs third modulation,
a fourth optical modulator 11 into which fourth light demultiplexed by the demultiplexing unit 3 is inputted and which performs fourth modulation,
a multiplexing unit 13 that multiplexes pieces of light outputted from the first optical modulator 5, the second optical modulator 7, the third optical modulator 9, and the fourth optical modulator 11, and
a control unit 15 that controls a drive signal applied to the first optical modulator 5, the second optical modulator 7, the third optical modulator 9, and the fourth optical modulator 11.

Regarding the first optical modulator 5 and the second optical modulator 7, when output light from the first optical modulator 5 and output light from the second optical modulator 7 are multiplexed by the multiplexing unit 13, even-ordered components or odd-ordered components included in the output light from the first optical modulator 5 and the output light from the second optical modulator 7 are cancelled, and
regarding the third optical modulator 9 and the fourth optical modulator 11, when output light from the third optical modulator 9 and output light from the fourth optical modulator 11 are multiplexed by the multiplexing unit 13, even-ordered components or odd-ordered components, which are included in the output light from the third optical modulator 9 and the output light from the fourth optical modulator 11 and which are the same as those cancelled in the output light from the first optical modulator 5 and the output light from the second optical modulator 7, are cancelled.

Thereby, the control unit 15 generates an optical comb signal whose frequency interval is twice the frequency of modulation signals of the first optical modulator 5, the second optical modulator 7, the third optical modulator 9, and the fourth optical modulator 11.

A preferred control unit of the optical comb generation device further controls the drive signal so that, regarding the first optical modulator 5 and the third optical modulator 9, at least one or more of components included in output light from the first optical modulator 5 and output light from the third optical modulator 9 are flattened when the output light from the first optical modulator 5 and the output light from the third optical modulator 9 are multiplexed by the multiplexing unit 13, and
regarding the second optical modulator 7 and the fourth optical modulator 11, at least one or more of components included in output light from the second optical modulator 7 and output light from the fourth optical modulator 11 are flattened when the output light from the second optical modulator 7 and the output light from the fourth optical modulator 11 are multiplexed by the multiplexing unit 13.

In a preferred optical comb generation device, intensities of the first light, the second light, the third light, and fourth light are the same, and
when modulation signals $a_1 t$, $a_2 t$, $a_3 t$, and $a_4 t$ of a first modulator, a second modulator, a third modulator, and a fourth modulator are respectively defined as follows:
$a_1 t = A_1 \sin 2\pi f_1 + \theta_1$,
$a_2 t = A_2 \sin 2\pi f_2 + \theta_2$,
$a_3 t = A_3 \sin 2\pi f_3 + \theta_3$, and
$a_4 t = A_4 \sin 2\pi f_4 + \theta_4$, here, $A_1$ to $A_4$ are amplitudes of the modulation signals, $f_1$ to $f_4$ are drive frequencies of the drive signals, and $\theta_1$ to $\theta_4$ are phase components of the drive signals $f_1=f_2=f_3=f_4=f$ is established, and following formulas are satisfied:

$|\theta_{b1}-\theta_{b2}|=\pi/2$, and $|\theta_{b3}-\theta_{b4}|=\pi/2$, here, $\theta_{b1}$, $\theta_{b2}$, $\theta_{b3}$, and $\theta_{b4}$ are bias signals applied to the first optical modulator 5, the second optical modulator 7, the third optical modulator 9, and the fourth optical modulator 11, respectively.

In the optical comb generation device, further, it is preferable that the modulation signals of the first modulator, the second modulator, the third modulator, and the fourth modulator satisfy following formulas:

$A_1-A_3/2\pm\theta_{b1}-\theta_{b3}/2=2k+\frac{1}{2}\pi$, and $A_2-A_4/2\pm\theta_{b2}-\theta_{b4}/2=2m+\frac{1}{2}\pi$, k and m are integers.

The optical comb generation device may have a group of n (n is an integer of 1 or more) first optical modulators and second optical modulators, and thereby the optical comb generation device may generate an optical comb having a frequency interval of (n+2)f when the modulation frequency of the optical modulators is f.

The optical comb generation device may be an optical comb generation device where the number of branches and the number of modulators in parallel are increased. The optical comb generation device may have a group of n (n is an integer of 1 or more) optical modulators or two or more groups of n optical modulators and thereby when a modulation frequency of the optical modulators is f, the optical comb generation device may generate an optical comb having frequency intervals of Nf (N is a number of 1 or more and n or less). In this case, one branch unit may branch into n waveguides or an integral multiple of n waveguides, and an optical modulator may exist in each waveguide. The waveguides may converge to one branch unit other than the above branch unit. Also in this case, a pair of two optical modulators generate an optical comb signal, components desired to be weakened among component of the optical comb signal are cancelled by opposite phases or the like, and signals desired to be intensified are set in-phase with each other, and thereby it is possible to increase the frequency intervals of the optical comb signal. When expanding this concept, it is possible to generate an optical comb signal having frequency intervals of Nf.

A second aspect of the present invention relates to an optical comb generation method.

This method has a step in which a demultiplexing unit 3 demultiplexes input light, a step in which first light demultiplexed by the demultiplexing unit 3 is inputted into a first optical modulator 5 and undergoes first modulation, a step in which second light demultiplexed by the demultiplexing unit 3 is inputted into a second optical modulator 7 and undergoes second modulation, a step in which third light demultiplexed by the demultiplexing unit 3 is inputted into a third optical modulator 9 and undergoes third modulation, a step in which fourth light demultiplexed by the demultiplexing unit 3 is inputted into a fourth optical modulator 11 and undergoes fourth modulation, and a step in which the light that has undergone the first modulation, the light that has undergone the second modulation, the light that has undergone the third modulation, and the light that has undergone the fourth modulation are multiplexed by the multiplexing unit 13.

Regarding the first modulation and the second modulation, when the light that has undergone the first modulation and the light that has undergone the second modulation are multiplexed by the multiplexing unit 13, even-ordered components or odd-ordered components included in the light that has undergone the first modulation and the light that has undergone the second modulation are cancelled, regarding the third modulation and the fourth modulation, when the light that has undergone the third modulation and the light that has undergone the fourth modulation are multiplexed by the multiplexing unit 13, even-ordered components or odd-ordered components, which are included in the light that has undergone the third modulation and the light that has undergone the fourth modulation and which are the same as those cancelled in the light that has undergone the first modulation and the light that has undergone the second modulation, are cancelled, regarding the first modulation and the third modulation, when the light that has undergone the first modulation and the light that has undergone the third modulation are multiplexed by the multiplexing unit 13, at least one or more of components included in the light that has undergone the first modulation and the light that has undergone the third modulation are flattened, regarding the second modulation and the fourth modulation, when the light that has undergone the second modulation and the light that has undergone the fourth modulation are multiplexed by the multiplexing unit 13, at least one or more of components included in the light that has undergone the second modulation and the light that has undergone the fourth modulation are flattened, and thereby, the optical comb generation method generates an optical comb signal whose frequency is twice the frequency of modulation signals of the first optical modulator 5, the second optical modulator 7, the third optical modulator 9, and the fourth optical modulator 11.

This method may be an optical comb generation method that generates an optical comb having frequency intervals of Nf by using the comb generation device described above.

Advantageous Effects of Invention

The present invention can provide an optical comb generation device and an optical comb signal generation method which can stably generate an optical comb signal having optical frequency intervals exceeding a drive electric signal band of a modulator.

DESCRIPTION OF EMBODIMENTS

Hereinafter, embodiments for carrying out the present invention will be described with reference to the drawings. The present invention is not limited to the embodiments described below, but also includes embodiments modified from the embodiments described below within an obvious range by those skilled in the art.

A first aspect of the present invention relates to an optical comb generation device. The optical comb generation device is a device that can generate an optical signal whose intensity is relatively uniform for each predetermined frequency. For example, regarding an optical comb signal, distribution of intensity of an optical signal in a region where intensity is relatively uniform is 0.3 or less and may be 0.2 or less or 0.1 or less. The optical comb generation device (generator) has already been known as described in JP 5665038 B1. The optical comb generation device is realized by a Mach-Zehnder modulator having two optical modulators held by both arms. The optical comb generator described in JP 5665038 B1 has a waveguide portion including an input unit of light, a branch unit at which light inputted into the input unit branches, a first waveguide through which light branched from the branch unit propagates, a second waveguide through which light which is branched from the branch unit (33) and which is different from the above light propagates, a multiplexing unit where an optical signal outputted from the first waveguide and an optical signal outputted from the second waveguide are multiplexed, and an optical signal output unit from which the optical signal multiplexed by the multiplexing unit is outputted. Further, the optical comb generation device includes a drive signal system for obtaining a first drive signal that drives a first waveguide and a second drive signal that drives a second waveguide and a bias signal system for obtaining a bias signal to be applied to the first waveguide and the second wave guide.

The drive signal system and the bias signal system drive the first drive signal, the second drive signal, and the bias signal so as to satisfy $\Delta A \pm \Delta \theta = \pi/2$. (Here, $\Delta A$ and $\Delta \theta$ are respectively defined by $\Delta A = (A_1 - A_2)/2$ and $\Delta \theta = (\theta_1 - \theta_2)/2$. $A_1$ and $A_2$ respectively represent optical phase shift amplitudes derived by the first drive signal and the second drive signal when the first drive signal and the second drive signal are inputted into an electrode. $\theta_1$ and $\theta_2$ represent optical phase shift amounts derived by an optical path length difference, a bias signal, and the like in the first waveguide and the second wave guide, respectively).

The optical comb generation device described in JP 5665038 B1 generates an optical comb signal where the frequency interval is f by performing control as described above.

Figure 1:
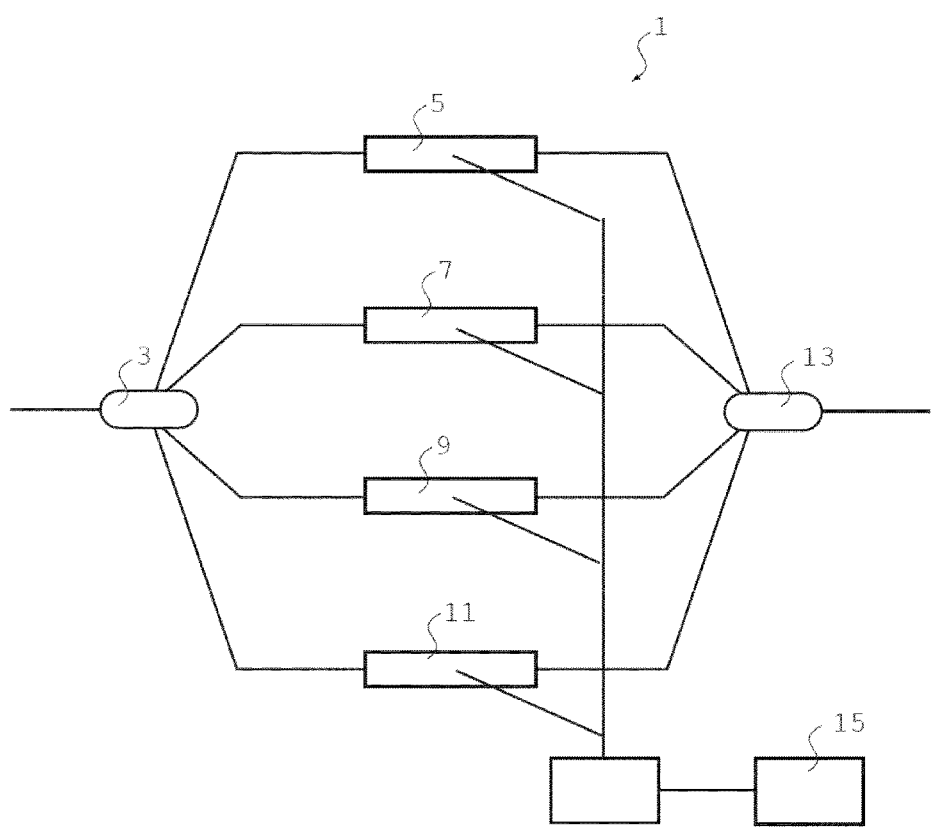
FIG. 1 is a block diagram for explaining an optical comb generation device 1 of the present invention.

FIG. 1 is a block diagram for explaining an optical comb generation device 1 of the present invention.

As shown in FIG. 1, the optical comb generation device 1 includes
a demultiplexing unit 3 that demultiplexes input light,
a first optical modulator 5 into which first light demultiplexed by the demultiplexing unit 3 is inputted and which performs first modulation,
a second optical modulator 7 into which second light demultiplexed by the demultiplexing unit 3 is inputted and which performs second modulation,
a third optical modulator 9 into which third light demultiplexed by the demultiplexing unit 3 is inputted and which performs third modulation,
a fourth optical modulator 11 into which fourth light demultiplexed by the demultiplexing unit 3 is inputted and which performs fourth modulation,
a multiplexing unit 13 that multiplexes pieces of light outputted from the first optical modulator 5, the second optical modulator 7, the third optical modulator 9, and the fourth optical modulator 11, and
a control unit 15 that controls a drive signal applied to the first optical modulator 5, the second optical modulator 7, the third optical modulator 9, and the fourth optical modulator 11. Each optical modulator may have a phase shifter in addition to a modulator main body.

Each element described above is connected by a waveguide (including an optical fiber) and/or a conductive wire, so that an optical signal and an electrical signal can be transmitted to each element. An example of the demultiplexing unit (branch unit) 3 and the multiplexing unit 13 is a photocoupler. Examples of the optical modulator are a frequency modulator, a phase modulator, and an intensity modulator. The optical modulator may be provided on an LN substrate or may be provided on silicon. The first optical modulator 5, the second optical modulator 7, the third optical modulator 9, and the fourth optical modulator 11 need not be arranged in this order.

Regarding the first optical modulator 5 and the second optical modulator 7, when output light from the first optical modulator 5 and output light from the second optical modulator 7 are multiplexed by the multiplexing unit 13, even-ordered components or odd-ordered components included in the output light from the first optical modulator 5 and the output light from the second optical modulator 7 are cancelled, and regarding the third optical modulator 9 and the fourth optical modulator 11, when output light from the third optical modulator 9 and output light from the fourth optical modulator 11 are multiplexed by the multiplexing unit 13, even-ordered components or odd-ordered components, which are included in the output light from the third optical modulator 9 and the output light from the fourth optical modulator 11 and which are the same as those cancelled in the output light from the first optical modulator 5 and the output light from the second optical modulator 7, are cancelled.

Thereby, the control unit 15 generates an optical comb signal whose frequency interval is twice the frequency of modulation signals of the first optical modulator 5, the second optical modulator 7, the third optical modulator 9, and the fourth optical modulator 11.

Hereinafter, a control example of the drive signal and the bias signal will be specifically described. Modulation signals $a_0(t)$, $a_1(t)$, $a_2(t)$, and $a_3(t)$ of a first modulator, a second modulator, a third modulator, and a fourth modulator are respectively defined as follows:

$a_0(t)=A_0 \sin(2\pi f_0+\theta_0)$,
$a_1(t)=A_1 \sin(2\pi f_1+\theta_1)$,
$a_2(t)=A_2 \sin(2\pi f_2+\theta_2)$, and
$a_3(t)=A_3 \sin(2\pi f_3+\theta_3)$ (Here, $A_0$ to $A_3$ are amplitudes of the modulation signals (optical phase shift amplitudes derived by drive signals when the drive signals are inputted into electrodes of the optical modulators), $f_0$ to $f_3$ are drive frequencies of the drive signals, and $\theta_0$ to $\theta_3$ are phase components of the drive signals)

The drive frequencies applied to the optical modulators are the same, so that $f_0=f_1=f_2=f_3=f$ is established.

In this case, $\theta_0$ to $\theta_3$ are adjusted so that an optical comb signal having intervals of a frequency f (first comb signal) is generated when light from the first optical modulator 5 and light from the second optical modulator 7 are multiplexed, and an optical comb signal having intervals of a frequency f (second comb signal) is generated when light from the third optical modulator 9 and light from the fourth optical modulator 11 are multiplexed. A specific example of the above is $\theta_0=0$, $\theta_1=\pi$, $\theta_2=0$, and $\theta_3=\pi$. A method of adjusting a phase of a drive signal system so that an optical comb signal is generated is known as described in Patent Literature 1 and Patent Literature 2.

As an example of $\theta_0$, $\theta_1$, $\theta_2$, and $\theta_3$, when $\theta_i=2\pi i l/n$ (i=1, 2, 3, or 4) is established, l is set to 0 or 1, and n=2, $\theta_0=0$, $\theta_1=\pi$, $\theta_2=0$, and $\theta_3=\pi$ may be set. Here, n is the number of branches of a modulator used to control a frequency interval of an optical comb to be generated. Here, n branch paths are added to perform spectrum flattening of an optical comb. Therefore, the number of modulators in parallel is 2n, that is, 4 in this case.

Next, the bias of the bias signal system satisfies the following formulas.

$|\theta_{b,0}-\theta_{b,1}|=\pi/2$, and
$|\theta_{b,2}-\theta_{b,3}|=\pi/2$ (Here, $\theta_{b,0}$, $\theta_{b,1}$, $\theta_{b,2}$, and $\theta_{b,3}$ are bias signals applied to the first optical modulator 5, the second optical modulator 7, the third optical modulator 9, and the fourth optical modulator 11, respectively.) Any one of $\theta_{b,0}$, $\theta_{b,1}$, $\theta_{b,2}$, and $\theta_{b,3}$ may be always 0, so that the bias signal need not be applied to all the optical modulators.

Regarding a relationship between $\theta_{b,0}$, $\theta_{b,1}$, $\theta_{b,2}$, and $\theta_{b,3}$, for example, L is set to 0 or 1 and n=2 is set in Formula A described later to obtain the following formulas:

[Mathematical 1]

$\theta_{b,0}=\arg(\xi_0)$
$\theta_{b,1}=\arg(\xi_1)$
$\theta_{b,2}=\arg(\xi_2)$
$\theta_{b,3}=\arg(\xi_3)$ In this case, $x_2$ may be replaced by $x_0$, $x_3$ may be replaced by $x_1$, $x_2$ and $x_0$ may be exchanged, and $x_3$ and $x_1$ may be exchanged.

Here, n is the number of branches of a modulator used to control a frequency interval of an optical comb to be generated. Here, n branch paths are added to perform spectrum flattening of an optical comb. Therefore, the number of modulators in parallel is 2n, that is, 4 in this case. In the present description, the Greek alphabet ξ may be represented as x or X.

By controlling the bias signal system, it is possible to adjust even/odd properties of mutually intensifying (mutually cancelling) components. Regarding the even-ordered component and the odd-ordered component, a component shifted by an integer multiple of 2f from a certain reference frequency position is the even-ordered component, and a component shifted by f and an integer multiple of 2f from a certain reference frequency position is the odd-ordered component.

It is possible to selectively switch and output an even-ordered component or an odd-ordered component by setting n=2 and switching L to 0 or 1 in Formula (A) described later.

By controlling the bias signal in this way, among signals included in the first comb signal and the second comb signal, components desired to be left intensify each other because their phases are aligned, and components desired to be cancelled each other cancel each other because their phases are shifted by π. As a result, it is possible to obtain an optical comb signal having intervals of 2f [Hz]. The first comb signal and the second comb signal may be obtained separately, and unnecessary components may be cancelled by multiplexing these comb signals. On the other hand, in the example shown in FIG. 1, multiplexing is performed at the same time in the multiplexing unit, so that the first comb signal and the second comb signal do not exist.

Figure 2:
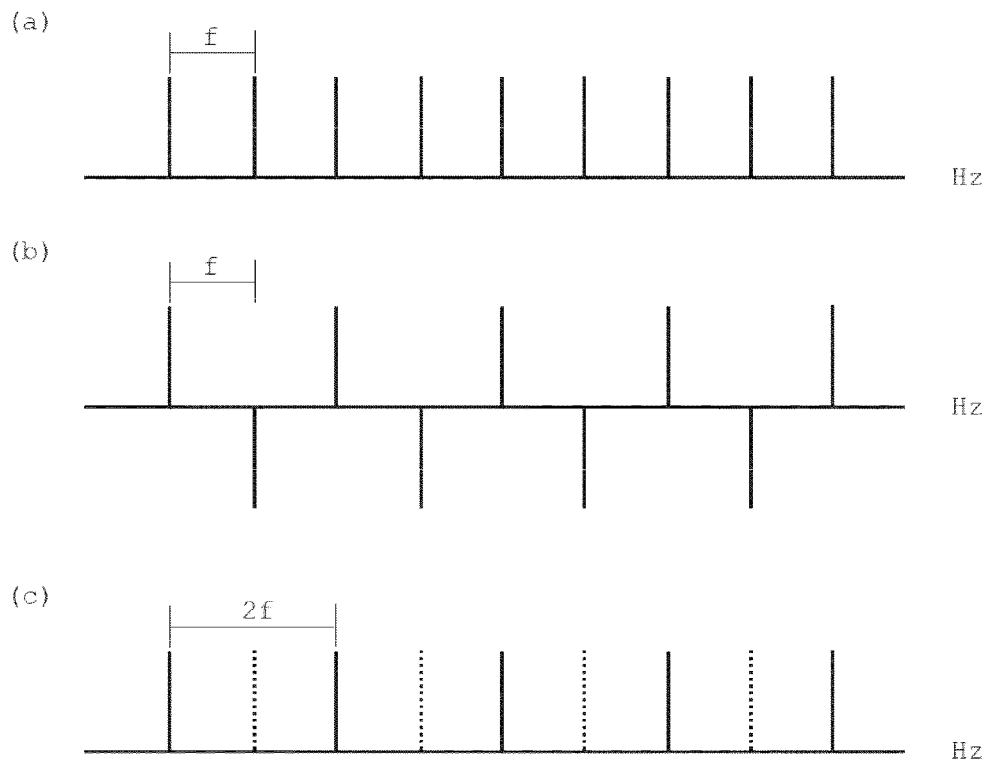
FIG. 2 is a conceptual diagram showing that an optical comb signal having intervals of 2f [Hz] is obtained.

FIG. 2 is a conceptual diagram showing that an optical comb signal having intervals of 2f [Hz] is obtained. FIG. 2(*a*) shows an optical comb signal (the first comb signal) having intervals of a frequency f obtained when light from the first optical modulator and light from the second optical modulator are multiplexed. FIG. 2(*b*) shows an optical comb signal (the second comb signal) having intervals of a frequency f obtained when light from the third optical modulator and light from the fourth optical modulator are multiplexed. FIG. 2(*c*) shows an optical comb signal having frequency intervals of 2f obtained when the first comb signal and the second comb signal are multiplexed.

This principle is the same in a case where the number of pairs of two phase modulators is sequentially increased. For example, when there are 2n phase modulators, a drive signal phase difference between an ith signal and (i+n)th signal may be set to $\theta_i=2\pi i l/n$. Here, l is an arbitrary integer other than 0. By doing so, a phase of a component desired to be cancelled in each optical comb can be shifted by a predetermined amount, and when the components are multiplexed, the components can be cancelled. When considering control of the bias signal system together, for example, in a case where an optical comb signal having intervals of 3f [Hz] is desired to be obtained, the phases of the components desired to be cancelled are 0, 2π/3, and 4π/3, so that when the components are multiplexed, the components are cancelled. In this way, the optical comb signal having intervals of 3f [Hz] can be obtained.

When expanding this concept, in addition to the four optical modulators described above, further a modulator group including a total of n modulators (n is an integer of 1 or more) or n first optical modulators and a second modulator group including a total of n modulators are included.

Thereby, when the modulation frequency of the optical modulators is f, an optical comb having a frequency interval of Nf can be generated. Here, N is an integer and $1 \leq N \leq n$ is established.

The control unit 15 further controls the drive signal so that, regarding the first optical modulator 5 and the third optical modulator 9, at least one or more components included in output light from the first optical modulator 5 and output light from the third optical modulator 9 are flattened when the output light from the first optical modulator 5 and the output light from the third optical modulator 9 are multiplexed by the multiplexing unit 13, and regarding the second optical modulator 7 and the fourth optical modulator 11, at least one or more of components included in output light from the second optical modulator 7 and output light from the fourth optical modulator 11 are flattened when the output light from the second optical modulator 7 and the output light from the fourth optical modulator 11 are multiplexed by the multiplexing unit 13.

In this case, the control unit 15 may control the modulation signals of the first modulator, the second modulator, the third modulator, and the fourth modulator so that the following formulas are satisfied:

$(A_1-A_3)/2 \pm (\theta_{b1}-\theta_{b3})/2 = (2k+\frac{1}{2})\pi$, and
$(A_2-A_4)/2 \pm (\theta_{b2}-\theta_{b4})/2 = (2m+\frac{1}{2})\pi$ (k and m are integers)

By doing so, an optical comb signal having intervals of a frequency f (the first comb signal) is generated when light from the first optical modulator 5 and light from the second optical modulator 7 are multiplexed, and the intensity of an optical comb signal having intervals of a frequency f (the second comb signal) becomes uniform when light from the third optical modulator 9 and light from the fourth optical modulator 11 are multiplexed, so that the intensity of components desired to be cancelled becomes uniform, and as a result, the components desired to be cancelled cancel each other completely in theory. Further, the intensity of components desired to intensify each other becomes uniform, so that the frequency interval of an optical comb signal to be obtained becomes large and components cancelling each other effectively disappear.

In the above description, the frequency interval of an optical comb is controlled and the spectrum flattening of an optical comb (intensity equalization of each frequency component) is performed. However, both of the above need not be applied.

Generalization when flattening of comb is not performed will be described.

Figure 3:
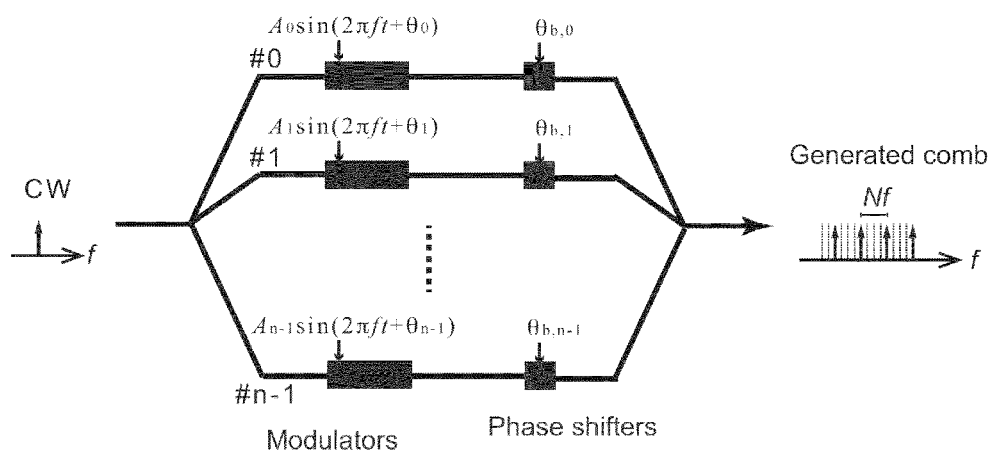
FIG. 3 is a conceptual diagram showing an optical comb generator where each branch path is provided with an optical phase adjuster.
Figure 4:
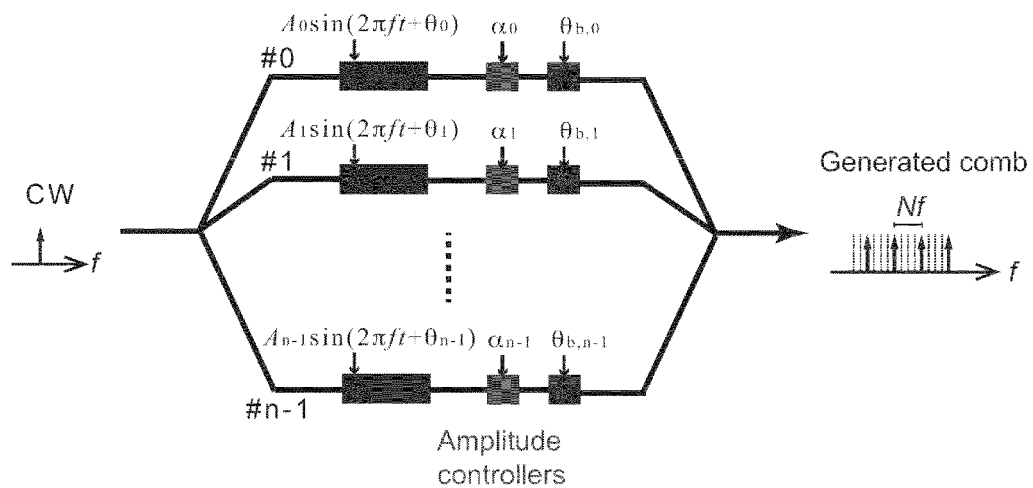
FIG. 4 is a conceptual diagram showing an optical comb generator where each branch path is provided with an optical phase adjuster and an amplitude adjuster.
Figure 5:
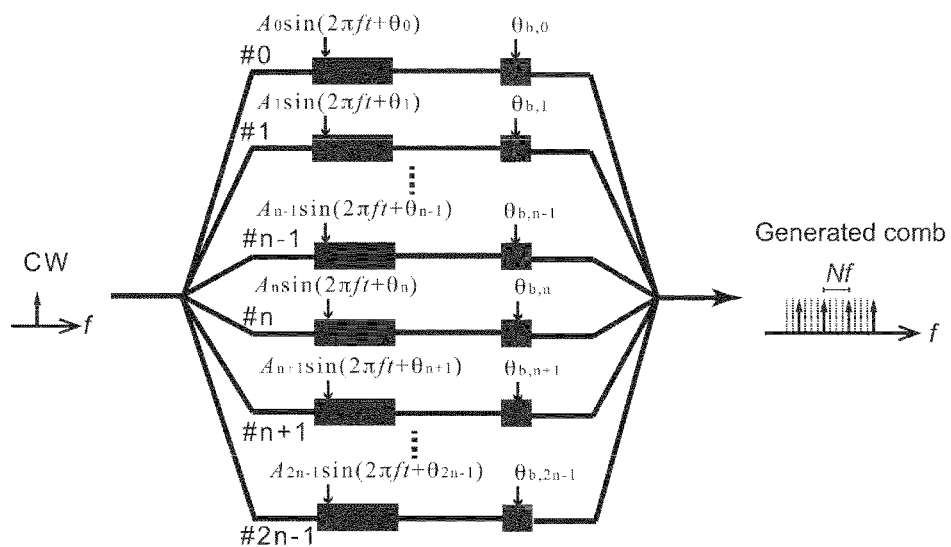
FIG. 5 is a conceptual diagram showing an optical comb generator having a parallel structure having 2n branch paths.

The modulator has a parallel structure having n branch paths, is provided with a modulator (phase modulator, amplitude modulator, and/or frequency modulator) structure that can perform drive electrical signal optical modulation at a frequency f in each branch path, and has a mechanism that can generate a harmonic component having a frequency of integer multiple of that of a drive signal and extract the harmonic component as an optical comb signal. Each branch path is provided with an optical phase adjuster (FIG. 3). Alternatively, each branch path is provided with an optical phase modulator and an amplitude adjuster (FIG. 4). FIG. 3 is a conceptual diagram showing an optical comb generator where each branch path is provided with an optical phase adjuster. FIG. 4 is a conceptual diagram showing an optical comb generator where each branch path is provided with an optical phase adjuster and an amplitude adjuster. Alternatively, the modulator has a parallel structure having 2n branch paths, is provided with a modulator (phase modulator, amplitude modulator, and/or frequency modulator) structure that can perform drive electrical signal optical modulation at a frequency f in each branch path, has a mechanism that can generate a harmonic component having a frequency of integer multiple of that of a drive signal and extract the harmonic component as an optical comb signal, and may have a structure where each branch path is provided with an optical phase adjuster (FIG. 5). FIG. 5 is a conceptual diagram showing an optical comb generator having a parallel structure having 2n branch paths.

Each modulator is driven by a drive signal of frequency f.

$f_0 = f_1 = f_2 = \ldots f_{n-1} = f$

The drive signal is desired to be a sine wave drive signal, but may be a periodic signal (period is 1/f).

When a signal that drives a modulator in each branch path is a sine wave, a phase difference of $\theta_i = 2\pi i l/n$ is given to the sine wave, and $a_i(t) = A_i \sin(2\pi f t + \theta_i)$ may be used as the drive signal. Here, l is an arbitrary integer other than 0. Further, i is an index indicating ith branch path, and i is in random order. When the drive signal is not a sine wave, the modulator in each branch path may give a time delay of t $(tau)_i = i/nf$ to the same time waveform.

Figure 6:
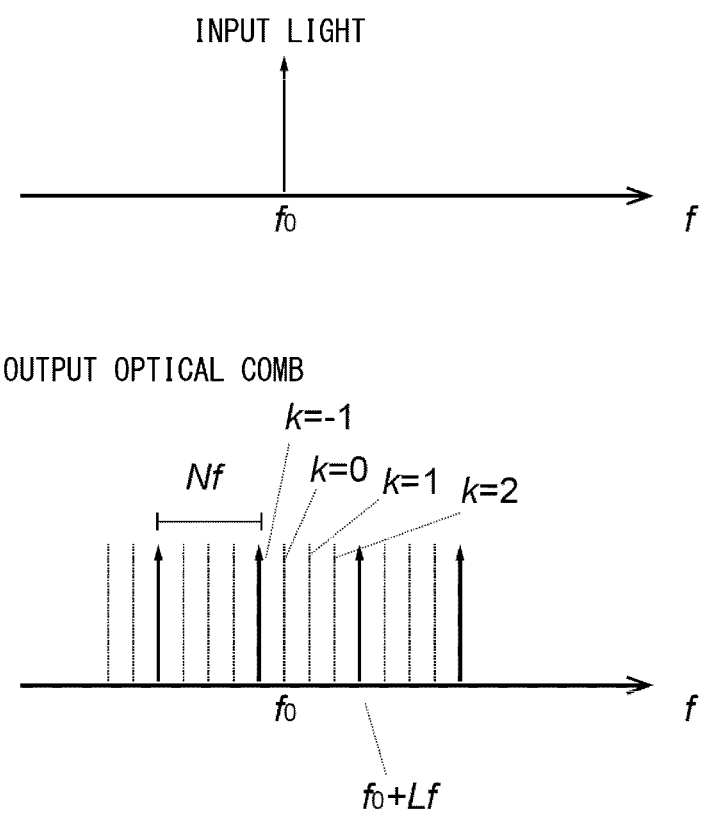
FIG. 6 shows input light (upper diagram) and output optical comb (lower diagram) when the number of modulator branches is 2n and when spectrum flattening of the output optical comb is performed by using a combination of optical combs outputted from two branch paths.

The degree of each optical frequency component of a comb generated by a modulator structure in each branch path is defined as k. Each frequency component of a generated comb is $f_k = f_0 + kf$ with respect to an input light wavelength ($f_0$) (FIG. 6). A center component degree of the generated comb is defined as L, a degree interval of the generated comb is defined as N, and the number of modulators in parallel is defined as n.

Generalization of Bias Condition

At this time, when a bias represented by Formula (A) below is given by using the optical phase adjuster on each branch path (FIG. 3), or the optical phase adjuster and/or the amplitude adjuster (FIG. 4), or FIG. 5, it is possible to generate an optical comb where the optical frequency interval is adjusted.

[Mathematical 2]

$$\Xi \equiv [\xi_0, \xi_1, \ldots, \xi_{n-1}] \qquad \text{Formula (A)}$$
$$= \left[1, \frac{n}{N}\sum_l e^{j\frac{2\pi(L+Nl)}{n}}, \frac{n}{N}\sum_l e^{j\frac{4\pi(L+Nl)}{n}}, \ldots, \frac{n}{N}\sum_l e^{j\frac{2\pi(n-1)(L+Nl)}{n}}\right]$$

Here,
$\Xi = [\xi_0, \xi_1, \ldots, \xi_{n-1}]$ [Mathematical 3]

is a complex number, and is a bias value (phase/amplitude adjustment value) given to zeroth, first, . . . , or (n−1)th branch path. Hereinafter, $|x_i|$ is a value of 0 or more and 1 or less for simplification. $|x_i|$ represents a loss given to each branch path. When $|x_i|$ is 0, it represents that light propagation in this branch path is completely blocked. When $|x_i|$ is 1, it represents that there is no loss in this branch path. A state of $|x_i| \geq 1$ can be made by providing amplifier to each branch path. Further, x, can include a loss and/or a phase shift due to incompleteness when the branch path is manufactured. In this case, the maximum value of $|x_i|$ is normalized to 1, and then this $|x_i|$ may be used in the description below.

In the case of FIG. 4, the values of $|x_i|$ and $arg(x_i)$ may be given by using the optical phase adjuster and the optical amplitude adjuster in each branch path.

First Drive Method $|x_0| = |x_1| = \ldots = |x_{n-1}|$

When the above formula is satisfied, only the optical phase adjuster may be provided in each branch path. For example, the above formula is always established when n=N is satisfied. For example, in a case of n=N=8, when the optical phase adjuster is provided in each branch path in a configuration of eight modulators in parallel, the optical amplitude adjuster need not be provided. At this time, an optical comb having intervals of 8f is generated regardless of a value of a center frequency Lf.

Second Drive Method

In the case of FIG. 5, an arbitrary $x_i$ can be set by a configuration of 2n modulators in parallel. The ith branch path and the (i+n)th branch path may be paired and driven in cooperation. When the optical phase adjuster is provided in each branch path, an arbitrary bias value can be achieved even if the optical amplitude adjuster is not provided. Conditions for the cooperative driving are as follows:
1. The drive signals of the ith branch path and the (i+n)th modulator have the same time waveform.
2. The drive signals of the ith branch path and the (i+n)th modulator do not have a phase difference.
3. Values to be given to the optical phase adjusters in the ith branch path and the (i+n)th branch path with respect to $x_i$ to be given are as follows:

$$\theta_{b,i} = \arg(\xi_i) \pm \cos^{-1}(|\xi_i|),$$

$$\theta_{b,i+n} = \arg(\xi_i) \mp \cos^{-1}(|\xi_i|). \qquad \text{[Mathematical 4]}$$

Here, $|x_i|$ is a value of 0 or more and 1 or less for simplification.

Third Drive Method

In the case of FIG. 4 and FIG. 5, a value of angular frequency of optical comb can be adjusted to an arbitrary amplitude and an arbitrary phase value (by a period nf on a frequency axis). When a k-ordered frequency component is desired to be adjusted to a value (complex number) of $\xi_k$ with a hat, $$\hat{\Xi} = [\hat{\xi}_0, \hat{\xi}_1, \ldots, \hat{\xi}_{n-1}] \qquad \text{[Mathematical 5]}$$

a Fourier series value for Equation 5 or a proportional value of the Fourier series value may be given as Equation 6.

$$\Xi = [\xi_0, \xi_1, \ldots, \xi_{n-1}] \qquad \text{[Mathematical 6]}$$

When the period nf on the frequency axis is extended, and control of amplitude and phase of an optical comb signal is performed in a wider band range, the number of modulators n in parallel may be increased. Conversion from X with a hat to X can be performed by discrete Fourier transform and may also be performed by using a numerical calculation algorithm such as fast Fourier transform.

The case of FIG. 3 can be applied when n is smaller than N and N is divisible by n.

In this case, when the optical phase adjuster is provided in each branch path in a configuration of n modulators in parallel, an optical comb having intervals of Nf can be generated even if the optical amplitude adjuster is not provided.

In this case, $|x_i|$ can only have a value of 0 or 1 in Formula (A). An optical phase shift of $\arg(x_i)$ may be given to the branch path corresponding to $|x_i|=1$. The number of branch paths of $|x_i|=0$ is $n(1-N^{-1})$ and is always 2 or more, so that pieces of light from these branch paths can be cancelled by causing the pieces of light to interfere with each other. The conditions to do so are as follows:
1. The drive signals for the branch paths corresponding to $|x_i|=0$ have the same time waveform, the same phase, and the same degree of modulation.
2. As an alternative means of the condition 1, the drive signals for the branch paths corresponding to $|x_i|=0$ are turned off, and optical modulation is not performed.
3. In addition to the condition 1 or 2, a phase adjustment amount (phase shift amount) described below is given as a bias value of the branch path corresponding to $|x_i|=0$.

$$\text{[Mathematical 7]}$$

$$\theta_{n,i} = \frac{2\pi i}{n(1-N^{-1})}$$

Fourth Drive Method

Next, a case of performing flattening of an optical comb to be generated will be described.

By adjusting the bias given to each branch path according to the method described above by the configuration of FIG. 3 or FIG. 4 or FIG. 5, the frequency component of the optical comb can be cancelled, and the spectrum can be flattened (drive method C). On the other hand, it is possible to obtain a flat optical comb by combining optical combs having different optical spectra. As shown in FIG. 5, the number of modulator branches is 2n, and spectrum flattening of output optical comb may be performed by using a combination of optical combs outputted from two branch paths. (Definition of flattening) For example, the ith and the (i+n)th optical modulators are combined, and these optical modulators may be driven under the following condition.

$$|\theta_{b,i} - \theta_{b,i+n}| - |A_i - A_{i+n}| = (2m \pm \tfrac{1}{2})\pi \qquad \text{[Mathematical 8]}$$

Here, m is an arbitrary integer. (Drive method D)

More generally, it is possible to synthesize a flat optical comb having a flat optical spectrum by combining optical combs having different optical spectral shapes outputted from three or more branch paths.

It is possible to perform both the adjustment of optical frequency interval and the flattening of optical comb. For example, when combining the method of FIG. 3 and the method of the drive method C, a modulator structure of 2n branch paths may be driven by the drive method C described above. Alternatively, when combining the method of FIG. 5 and the method of (drive method D), a modulator structure of 4n branch paths may be driven by the above condition, that is, the drive method D. FIG. 6 shows input light (upper diagram) and output optical comb (lower diagram) when the number of modulator branches is 2n and when performing spectrum flattening of the output optical comb by using a combination of optical combs outputted from two branch paths.

Figure 7:
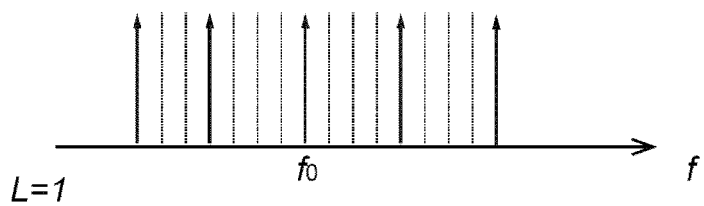
FIG. 7 is a diagram showing that a frequency shift value can be dynamically selected by controlling a value of L and a multi-valued optical FSK can be performed thereby.
Figure 7:
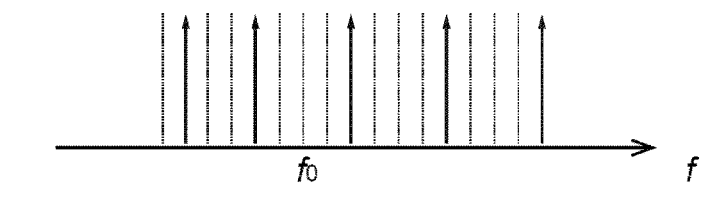
Figure 7:
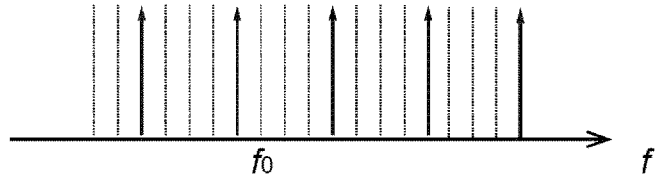

By controlling a value of L (integer) with the bias described above, a plurality of frequency shift values can be dynamically selected. This is also used as an optical frequency shifter and a multi-valued optical FSK where a signal can be mounted between a plurality of frequencies (FIG. 7). The condition related to the above bias control and the condition related to the drive signals are ideal values, and even when there is an error (for example, about 10%), a desired operation can be obtained around the values (in this case, unnecessary optical component is radiated).

An example of the control unit 15 is a computer connected with a power source. The computer has an input/output unit, a control unit, a calculation unit, and a storage unit, and these elements are connected by a bus and the like so as to be able to transmit and receive information. The control unit receives an instruction of a control program stored in the storage unit, properly reads inputted information and/or information stored in the storage unit, performs calculation, stores a calculation result in the storage unit, and outputs the calculation result from the output unit. In the present invention, the control unit outputs a control signal for outputting a predetermined drive signal and a bias signal to the power source.

An optical frequency comb generation device of the present invention also provides an optical comb FSK (Frequency Shift Keying) apparatus that can apply variation of a generation position of an optical comb signal as information. When the applied information is binary, the optical comb generation device shown in FIG. 1 can be functioned as an optical FSK modulator using an optical comb by controlling variation of even/odd properties of mutually intensifying or mutually weakening optical signals as binary data of 0 or 1. As described above, the even/odd properties of optical signals can be easily obtained by controlling the drive signal and the bias signal in the control unit 15. Then, it is possible to perform frequency modulation by using a signal called an optical comb signal which has a plurality of frequencies at the same time, so that it is possible to provide a communication technique which is difficult to encrypt when being intercepted.

For example, in a case of an optical comb signal of 4f [Hz] intervals, it is possible to mount four-value information on the optical comb signal by controlling so as to output one of optical combs shifted from a certain reference frequency point by (4m+1)f [Hz], (4m+2)f [Hz], (4m+3)f [Hz], and (4m+4)f [Hz], respectively (m=0, 1, 2, 3, and so on).

Figure 8:
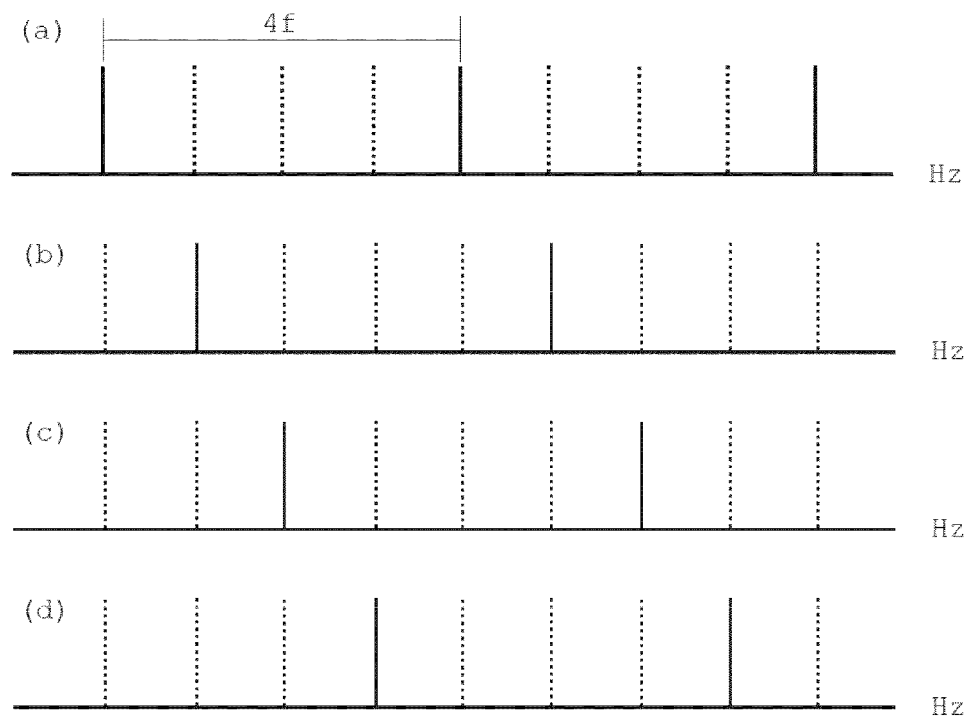
FIG. 8 shows an example where an optical comb signal having intervals of 4f [Hz] is used as an FSK signal.

FIG. 8 shows an example where an optical comb signal of 4f [Hz] intervals is used as an FSK signal. The optical comb signal can be realized by using a system where eight optical modulators are aligned in parallel. FIG. 8 (*a*) shows an example of an optical comb signal where a signal exists at a position of a reference value 4mf {hz} and positions of (4m+4)f [Hz] (m=0, 1, 2, 3, and so on). FIG. 8(*b*) shows an example of an optical comb signal shifted from a certain reference frequency point by (4m+1)f [Hz]. FIG. 8(*c*) shows an example of an optical comb signal shifted from a certain reference frequency point by (4m+2)f [Hz]. FIG. 8(*d*) shows an example of an optical comb signal shifted from a certain reference frequency point by (4m+3)f [Hz]. In these examples, it is possible to mount four-value information formed by variation of the frequency of the comb signal on the optical comb signal by selectively switching FIG. 8(*a*), FIG. 8(*b*), FIG. 8(*c*), and FIG. 8(*d*).

As light sources used for the optical frequency comb generation device of the present invention, there are a light source that can output continuous light (CW) and a distributed feedback semiconductor laser (DFB laser). A constant optical output operation type DFB laser is preferred because of having high single wavelength selectivity. A band of light may not only be C-band, but may also be L-band on a long wavelength side of the C-band or S-band on a short wavelength side of the C-band. The optical intensity may be 1 mW to 50 mW.

As a waveguide used for the optical frequency comb generation device of the present invention, a known waveguide used for an optical modulator can be properly used. A preferred aspect of the present invention is a Mach-Zehnder type optical modulator, so that the Mach-Zehnder type optical modulator will be mainly described below. Normally, a Mach-Zehnder waveguide and a Mach-Zehnder electrode are provided on a substrate. The substrate and each waveguide are not limited particularly as long as they can propagate light. For example, a Ti-diffused lithium niobate waveguide may be formed on an LN substrate, or a silicon dioxide ($SiO_2$) waveguide may be formed on a silicon (Si) substrate. Alternatively, an optical semiconductor waveguide where an InGaAsP or GaAlAs waveguide is formed on an InP or GaAs substrate may be used. As the substrate, lithium niobate ($LiNbO_3$: LN) that is cut out so as to use X-cut and Z-axis propagation is preferred. This is because a large electro-optic effect can be used and thereby low electric power drive is possible, and further an excellent response speed can be obtained. An optical waveguide is formed on a surface of an X cut surface (YZ surface) of the substrate, and guided light propagates along the Z axis (optical axis). A lithium niobate substrate other than X cut may be user. Further, as the substrate, it is possible to use a uniaxial crystal such as a trigonal system and a hexagonal system which have electro-optic effects, or materials where the point group of a crystal is $C_{3V}$, $C_3$, $D_3$, $C_{3h}$, and $D_{3h}$. These materials have a refractive index adjusting function where a refractive index change indicates the opposite sign according to a mode of propagation light when an electric field is applied. As a specific example, it is possible to use lithium tantalate ($LiTO_3$: LT), $\beta$-$BaB_2O_4$ (abbreviation is BBO), $LiIO_3$, and the like, in addition to lithium niobate.

The optical frequency comb generation device of the present invention has a modulation electrode. The modulation electrode may be separately provided to each arm, or two types of drive signals may be applied to one electrode. There is a progressive wave type electrode or a resonance type electrode as the modulation electrode. When setting an optical frequency interval to be generated to a specific value, it is possible to use the resonance type electrode. However, to freely design the optical frequency interval, it is preferable to use the progressive wave type electrode as the modulation electrode. As a modulation signal applied to two arms, for example, there is a periodic signal whose repetition frequency is constant, and specifically there is a sine wave signal. When a frequency of a periodic signal such as a sine wave signal is $\omega$, if a modulation signal of frequency $\omega$ is applied, an optical frequency comb having intervals of frequency $\omega$ is generated from the optical frequency comb generation device of the present invention. However, spectrum intervals of the optical frequency comb outputted from the optical frequency comb generation device of the present invention need not be constant, the repetition frequency need not be constant as a drive signal. For example, a signal where the frequency of the drive signal changes over time may be used.

Preferably, the modulation electrode is connected to a high-frequency electrical signal source. The high-frequency electrical signal source is a device for generating a signal to be transmitted to the modulation electrode. It is possible to adopt a known high-frequency electrical signal source. The frequency ($f_m$) of a high-frequency signal inputted into the modulation electrode is, for example, 1 GHz to 100 GHz. As an output of the high-frequency electrical signal source, there is a sine wave having a constant frequency. It is preferable that a phase modulator is provided to an output of the high-frequency electrical signal source and a phase of an output signal can be controlled. An electrical signal outputted from the high-frequency electrical signal source is branched, and a phase or the like of one branched electrical signal is adjusted by a modulator (delay device) or the like and then the branched electrical signal may be applied to the modulation electrode.

The modulation electrode is composed of, for example, gold, platinum, or the like. The width of the modulation electrode may be 1 μm to 10 μm, and specifically may be 5 μm. The length of the modulation electrode may be 0.1 to 0.9 times the wavelength ($f_m$) of the modulation signal, or may be 0.18 to 0.22 times the wavelength ($f_m$), or may be 0.67 to 0.70 times the wavelength ($f_m$), and more preferably may be 20 to 25% shorter than a resonance point of the modulation signal. This is because a synthetic impedance with a stab electrode remains within an appropriate range when using such lengths. A more specific length of the modulation electrode may be 3250 µm. Hereinafter, the resonance type electrode and the progressive wave type electrode will be described.

As the progressive wave type electrode, preferably, there is a progressive wave type electrode that adopts a so-called symmetrical ground electrode arrangement (at least a pair of ground electrodes are provided on both sides of a progressive wave type signal electrode). In this way, the ground electrodes are symmetrically arranged on both sides of the signal electrode, so that a high-frequency wave outputted from the signal electrode is easily applied to the ground electrodes arranged on the left and right sides of the signal electrode. Therefore, it is possible to suppress radiation of the high-frequency wave to the substrate.

The bias signal system is a signal system for controlling a bias voltage to be applied. Specifically, the bias signal system includes a bias power source system and a bias adjusting electrode. The bias adjusting electrode is an electrode for controlling a phase of light propagating through two arms by being connected to the bias power source system and controlling a bias voltage between the two arms. Preferably, a direct current or a low-frequency signal is normally applied to the bias adjusting electrode. Here, the "low-frequency" of the low-frequency signal means, for example, a frequency of 0 Hz to 500 MHz. It is preferable that a phase modulator that adjusts a phase of an electrical signal is provided to an output of a signal source of the low-frequency signal and a phase of an output signal can be controlled.

The modulation electrode and the bias adjusting electrode may be separately configured, or one electrode may play roles of both electrodes. That is, the modulation electrode may be connected to a power feeding circuit (bias circuit) that mixes a DC signal and an RF signal and supplies the mixed signal.

In the optical frequency comb generation device of the present invention, it is preferable that a control unit electrically connected to a signal source of each electrode is provided in order to appropriately control timing and phase of a signal applied to each electrode. Such a control unit functions so as to adjust modulation time of signals applied to the modulation electrode and the bias adjusting electrode. Specifically, the control unit adjusts the modulation time so that modulation by each electrode is performed on a certain specific signal by considering light propagation time. The adjustment time may be set to an appropriate value according to a distance between the electrodes or the like.

The optical frequency comb generation device of the present invention may be composed of a substrate, a waveguide provided on the substrate, an electrode, a signal source, and the like. As a forming method of the waveguide, a known forming method such as an internal diffusion method including a titanium diffusion method or a proton exchange method can be used. In other words, the optical frequency comb generation device of the present invention can be manufactured, for example, in a manner as described below. First, titanium is patterned on a wafer of lithium niobate by a photolithography method, titanium is diffused by a thermal diffusion method, and an optical waveguide is formed. Regarding conditions in this case, the thickness of titanium may be 100 to 2000 angstrom, the diffusion temperature may be 500 to 2000° C., and the diffusion time may be 10 to 40 hours. An insulating buffer layer of silicon dioxide (thickness is 0.5 to 2 µm) is formed on a main surface of the substrate. Subsequently, an electrode of plating metal with a thickness of 15 to 30 µm is formed on the insulating buffer layer. Subsequently, the wafer is cut. In this way, an optical modulator where a titanium-diffused waveguide is formed is formed.

The optical frequency comb generation device can also be manufactured in a manner as described below. First, a waveguide is formed on a substrate. The waveguide can be provided by performing a proton exchange method or a titanium thermal diffusion method on a surface of a lithium niobate substrate. For example, stripes of Ti metal of several micro meters are formed on an LN substrate by a photolithography technique in a state where the stripes are formed in rows on the LN substrate. Thereafter, the LN substrate is exposed to high temperature around 1000° C. and the Ti metal is diffused inside the substrate. In this way, the waveguide can be formed on the LN substrate.

Electrodes can be manufactured in the same manner as described above. For example, it is possible to form electrodes between both sides of many waveguides formed in the same width by the photolithography technique in the same manner as formation of the optical waveguide to form the electrodes so that an interelectrode gap is about 1 micro meter to 50 micro meters.

When a silicon substrate is used, for example, the optical frequency comb generation device can be manufactured in a manner as described below. A lower clad layer composed mainly of silicon dioxide ($SiO_2$) is deposited on a silicon (Si) substrate by a flame deposition method. Next, a core layer composed mainly of silicon dioxide ($SiO_2$) where germanium dioxide ($GeO_2$) is added as a dopant is deposited. Thereafter, they are transparently vitrified in an electric furnace. Next, an optical waveguide portion is manufactured by etching, and further, an upper clad layer composed mainly of silicon dioxide ($SiO_2$) is deposited. Then, a thin-film heater type thermooptic intensity modulator and a film heater type thermooptic phase modulator are formed in the upper clad layer.

A process example of an optical comb generation method is as follows:

The demultiplexing unit 3 demultiplexes input light.

First light demultiplexed by the demultiplexing unit 3 is inputted into a first optical modulator 5 and undergoes first modulation.

Second light demultiplexed by the demultiplexing unit 3 is inputted into a second optical modulator 7 and undergoes second modulation.

Third light demultiplexed by the demultiplexing unit 3 is inputted into a third optical modulator 9 and undergoes third modulation.

Fourth light demultiplexed by the demultiplexing unit 3 is inputted into a fourth optical modulator 11 and undergoes fourth modulation.

Normally, the first to the fourth modulations are performed at the same time.

The light that has undergone the first modulation, the light that has undergone the second modulation, the light that has undergone the third modulation, and the light that has undergone the fourth modulation are multiplexed by the multiplexing unit 13.

On the other hand, the control unit 15 adjusts a drive signal and a bias signal that are applied to the first optical modulator 5, the second optical modulator 7, the third optical modulator 9, and the fourth optical modulator 11.

As a result, when the light that has undergone the first modulation, the light that has undergone the second modulation, the light that has undergone the third modulation, and the light that has undergone the fourth modulation are multiplexed by the multiplexing unit 13, regarding the first modulation and the second modulation, when the light that has undergone the first modulation and the light that has undergone the second modulation are multiplexed by the multiplexing unit 13, even-ordered components or odd-ordered components included in the light that has undergone the first modulation and the light that has undergone the second modulation are cancelled, and regarding the third modulation and the fourth modulation, when the light that has undergone the third modulation and the light that has undergone the fourth modulation are multiplexed by the multiplexing unit 13, even-ordered components or odd-ordered components, which are included in the light that has undergone the third modulation and the light that has undergone the fourth modulation and which are the same as those cancelled in the light that has undergone the first modulation and the light that has undergone the second modulation, are cancelled. Thereby, the optical comb generation method generates an optical comb signal whose frequency is twice the frequency of modulation signals of the first optical modulator 5, the second optical modulator 7, the third optical modulator 9, and the fourth optical modulator 11.

Further, in a preferred aspect, regarding the first modulation and the third modulation, when the light that has undergone the first modulation and the light that has undergone the third modulation are multiplexed by the multiplexing unit 13, at least one or more of components included in the light that has undergone the first modulation and the light that has undergone the third modulation are flattened, and regarding the second modulation and the fourth modulation, when the light that has undergone the second modulation and the light that has undergone the fourth modulation are multiplexed by the multiplexing unit 13, at least one or more of components included in the light that has undergone the second modulation and the light that has undergone the fourth modulation are flattened.

Thereby, it is possible to generate a flat optical comb signal whose frequency is twice the frequency of the modulation signal.

First Embodiment

Figure 9:
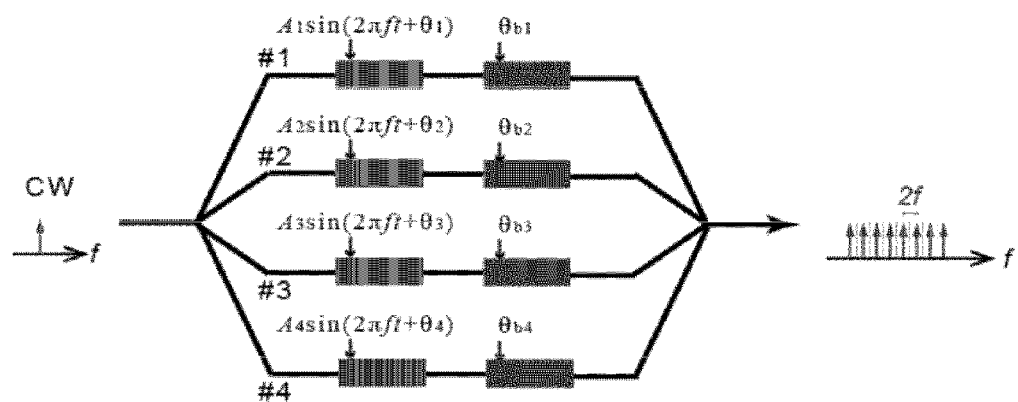
FIG. 9 is a block diagram of an optical comb generation device in a first embodiment.

FIG. 9 is a block diagram of an optical comb generation device in a first embodiment. To demonstrate the principle of the present invention, a system shown in FIG. 9 where four optical modulators are aligned in parallel is assumed. The followings are assumed as the drive signal and the bias signal applied to each electrode.

$A_1 = A_2 = 16.10$ [rad],
$A_3 = A_4 = 15.31$ [rad],
$\theta_1 = \theta_3 = 0$,
$\theta_2 = \theta_4 = 1.570$ [rad],
$\theta_{b1} = -0.785$ [rad],
$\theta_{b2} = 0.785$ [rad],
$\theta_{b3} = 0$ [rad],
$\theta_{b4} = -1.570$ [rad],
$f_1 = f_2 = f_3 = f_4 = 25$ [GHz]

Figure 10A:
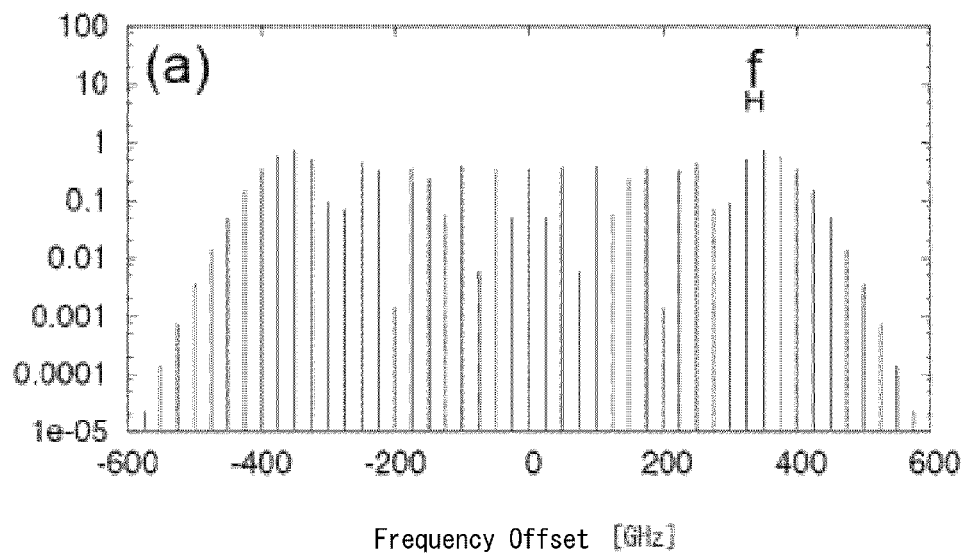
FIG. 10(a) is a graph changed from a drawing showing an output signal from a first optical modulator.
Figure 10B:
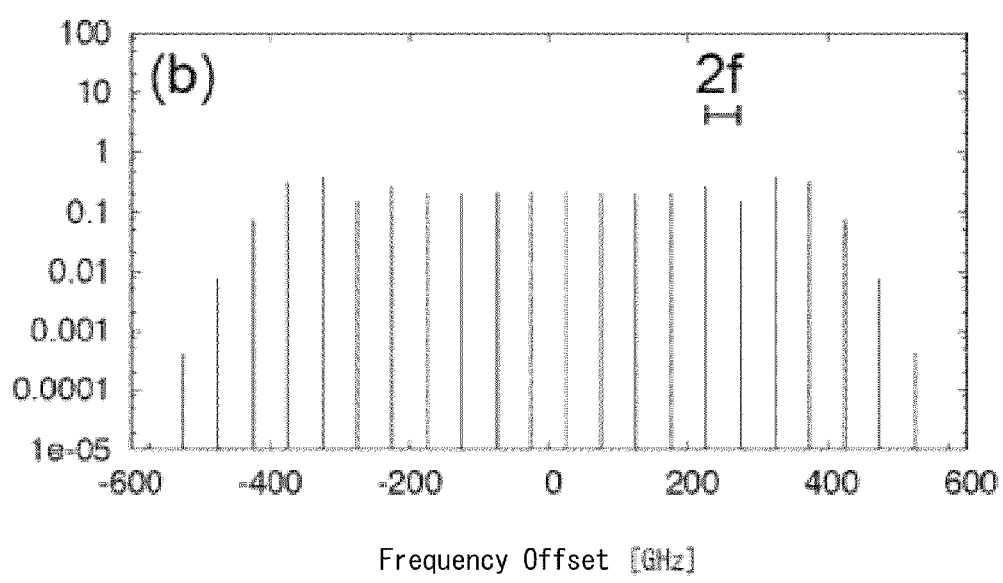
FIG. 10(b) is a graph changed from a drawing showing a multiplexed signal.

FIG. 10 is a graph changed from a drawing showing an output signal. FIG. 10(*a*) shows an output signal from a first optical modulator (#1). FIG. 10(*b*) shows an output of a multiplexed signal. As shown in FIG. 10, it is shown that an optical comb signal, which has frequency intervals of 2f [Hz] and whose intensity is relatively uniform, can be obtained.

Second Embodiment

Figure 11:
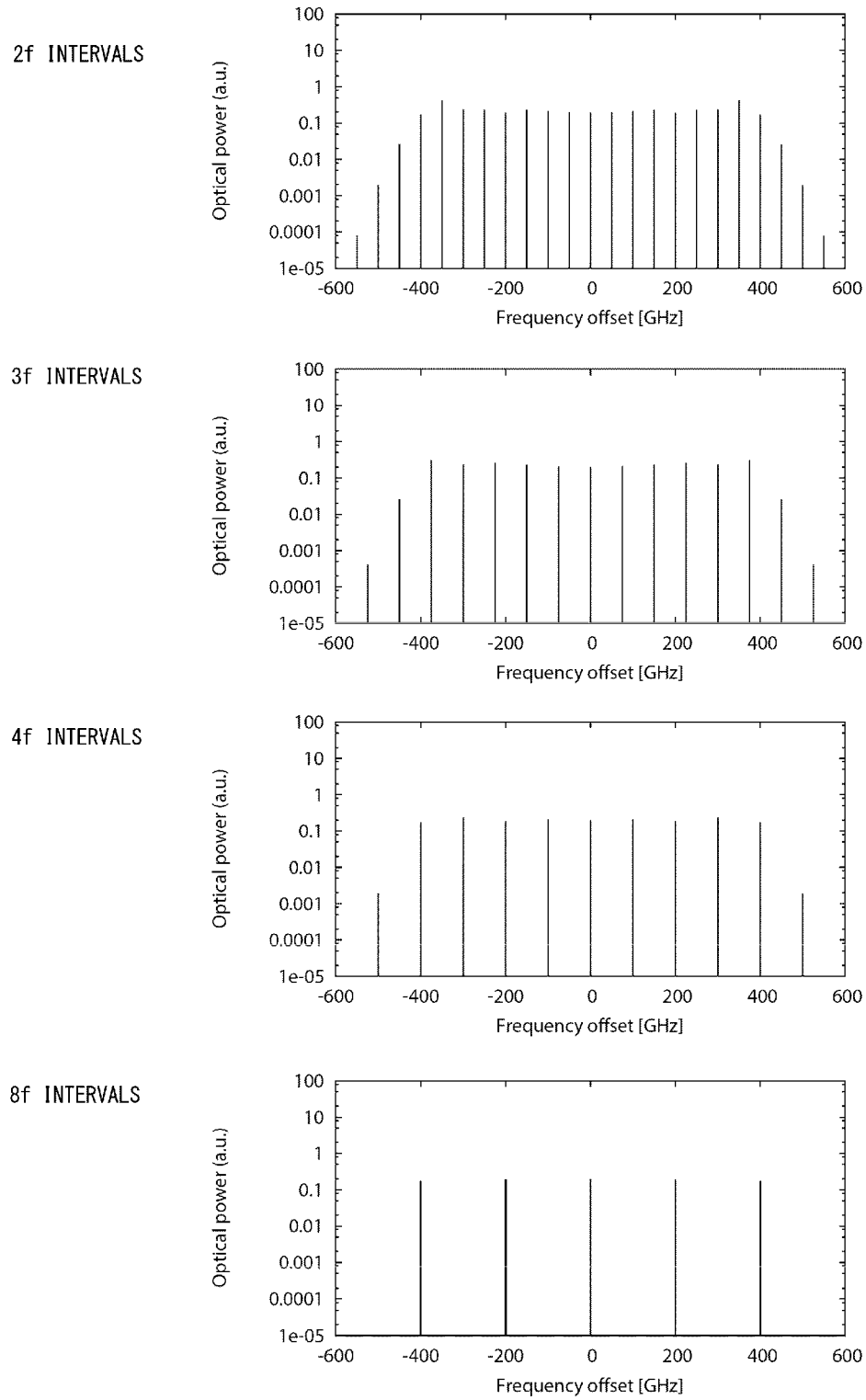
FIG. 11 is a graph changed from a drawing showing a multiple frequency interval optical comb signal obtained in a second embodiment.

In the same manner as in the first embodiment, a case of obtaining optical comb signals having frequency intervals of 2f [Hz], 3f [Hz], 4f [Hz], and 8f [Hz] is assumed, and a result thereof is simulated. The result is shown in FIG. 11. FIG. 11 is a graph changed from a drawing showing a multiple frequency interval optical comb signal obtained based on the present invention. The vertical axis represents optical intensity (arbitrary unit) and the horizontal axis represents frequency offset.

INDUSTRIAL APPLICABILITY

The present invention is used in a field of optical information communication.

REFERENCE SIGNS LIST

1 Optical comb generation device
3 Demultiplexing unit
5, 7, 9, 11 Optical modulator
13 Multiplexing unit
15 Control unit

The invention claimed is:

1. An optical comb generation device (1) comprising:
a demultiplexing unit (3) that demultiplexes input light;
a first optical modulator (5) into which first light demultiplexed by the demultiplexing unit (3) is inputted and which performs first modulation;
a second optical modulator (7) into which second light demultiplexed by the demultiplexing unit (3) is inputted and which performs second modulation;
a third optical modulator (9) into which third light demultiplexed by the demultiplexing unit (3) is inputted and which performs third modulation;
a fourth optical modulator (11) into which fourth light demultiplexed by the demultiplexing unit (3) is inputted and which performs fourth modulation;
a multiplexing unit (13) that multiplexes pieces of light outputted from the first optical modulator (5), the second optical modulator (7), the third optical modulator (9), and the fourth optical modulator (11); and
a control unit (15) that controls a drive signal applied to the first optical modulator (5), the second optical modulator (7), the third optical modulator (9), and the fourth optical modulator (11), wherein
regarding the first optical modulator (5) and the second optical modulator (7), when output light from the first optical modulator (5) and output light from the second optical modulator (7) are multiplexed by the multiplexing unit (13), even-ordered components or odd-ordered components included in the output light from the first optical modulator (5) and the output light from the second optical modulator (7) are cancelled, and
regarding the third optical modulator (9) and the fourth optical modulator (11), when output light from the third optical modulator (9) and output light from the fourth optical modulator (11) are multiplexed by the multiplexing unit (13), even-ordered components or odd-ordered components, which are included in the output light from the third optical modulator (9) and the output light from the fourth optical modulator (11) and which are the same as those cancelled in the output light from the first optical modulator (5) and the output light from the second optical modulator (7), are cancelled, and
thereby, the control unit (15) generates an optical comb signal whose frequency interval is twice the frequency of modulation signals of the first optical modulator (5), the second optical modulator (7), the third optical modulator (9), and the fourth optical modulator (11).

2. The optical comb generation device according to claim 1, wherein the control unit further controls the drive signal so that,
regarding the first optical modulator (5) and the third optical modulator (9), at least one or more of components included in the output light from the first optical modulator (5) and the output light from the third optical modulator (9) are flattened when the output light from the first optical modulator (5) and the output light from the third optical modulator (9) are multiplexed by the multiplexing unit (13), and
regarding the second optical modulator (7) and the fourth optical modulator (11), at least one or more of components included in the output light from the second optical modulator (7) and the output light from the fourth optical modulator (11) are flattened when the output light from the second optical modulator (7) and the output light from the fourth optical modulator (11) are multiplexed by the multiplexing unit (13).

3. The optical comb generation device according to claim 1, wherein intensities of the first light, the second light, the third light, and fourth light are the same, and
when modulation signals $a_1(t)$, $a_2(t)$, $a_3(t)$, and $a_4(t)$ of a first modulator, a second modulator, a third modulator, and a fourth modulator are respectively defined as follows:
$a_1(t)=A_1 \sin(2\pi f_1+\theta_1)$,
$a_2(t)=A_2 \sin(2\pi f_2+\theta_2)$,
$a_3(t)=A_3 \sin(2\pi f_3+\theta_3)$, and
$a_4(t)=A_4 \sin(2\pi f_4+\theta_4)$,
(here, $A_1$ to $A_4$ are amplitudes of the modulation signals, $f_1$ to $f_4$ are drive frequencies of the drive signals, and $\theta_1$ to $\theta_4$ are phase components of the drive signals)
$f_1=f_2=f_3=f_4=f$, and
following formulas are satisfied:
$|\theta_{b1}-\theta_{b2}|=\pi/2$, and
$|\theta_{b3}-\theta_{b4}|=\pi/2$
(here, $\theta_{b1}$, $\theta_{b2}$, $\theta_{b3}$, and $\theta_{b4}$ are bias signals applied to the first optical modulator (5), the second optical modulator (7), the third optical modulator (9), and the fourth optical modulator (11), respectively).

4. The optical comb generation device according to claim 3, wherein the modulation signals of the first modulator, the second modulator, the third modulator, and the fourth modulator satisfy following formulas:
$(A_1-A_3)/2\pm(\theta_{b1}-\theta_{b3})/2=(2k+\frac{1}{2})\pi$, and
$(A_2-A_4)/2\pm(\theta_{b2}-\theta_{b4})/2=(2m+\frac{1}{2})\pi$
(k and m are integers).

5. The optical comb generation device according to claim 1, wherein a group of n (n is an integer of 1 or more) optical modulators or two or more groups of n optical modulators are included and thereby when a modulation frequency of the optical modulators is f, the optical comb generation device generates an optical comb having frequency intervals of Nf (N is a number of 1 to n).

6. An optical comb generation method comprising:

a step in which a demultiplexing unit (3) demultiplexes input light;
a step in which first light demultiplexed by the demultiplexing unit (3) is inputted into a first optical modulator (5) and undergoes first modulation;
a step in which second light demultiplexed by the demultiplexing unit (3) is inputted into a second optical modulator (7) and undergoes second modulation;
a step in which third light demultiplexed by the demultiplexing unit (3) is inputted into a third optical modulator (9) and undergoes third modulation;
a step in which fourth light demultiplexed by the demultiplexing unit (3) is inputted into a fourth optical modulator (11) and undergoes fourth modulation; and
a step in which the light that has undergone the first modulation, the light that has undergone the second modulation, the light that has undergone the third modulation, and the light that has undergone the fourth modulation are multiplexed by the multiplexing unit (13), wherein
regarding the first modulation and the second modulation, when the light that has undergone the first modulation and the light that has undergone the second modulation are multiplexed by the multiplexing unit (13), even-ordered components or odd-ordered components included in the light that has undergone the first modulation and the light that has undergone the second modulation are cancelled,
regarding the third modulation and the fourth modulation, when the light that has undergone the third modulation and the light that has undergone the fourth modulation are multiplexed by the multiplexing unit (13), even-ordered components or odd-ordered components, which are included in the light that has undergone the third modulation and the light that has undergone the fourth modulation and which are the same as those cancelled in the light that has undergone the first modulation and the light that has undergone the second modulation, are cancelled,
regarding the first modulation and the third modulation, when the light that has undergone the first modulation and the light that has undergone the third modulation are multiplexed by the multiplexing unit (13), at least one or more of components included in the light that has undergone the first modulation and the light that has undergone the third modulation are flattened,
regarding the second modulation and the fourth modulation, when the light that has undergone the second modulation and the light that has undergone the fourth modulation are multiplexed by the multiplexing unit (13), at least one or more of components included in the light that has undergone the second modulation and the light that has undergone the fourth modulation are flattened, and
thereby, the optical comb generation method generates an optical comb signal whose frequency is twice the frequency of modulation signals of the first optical modulator (5), the second optical modulator (7), the third optical modulator (9), and the fourth optical modulator (11).

* * * * *